United States Patent [19]

Umeda et al.

[11] Patent Number: 5,031,172
[45] Date of Patent: Jul. 9, 1991

[54] UNIT AND DISC HAVING A RELATIVELY ROUGH SURFACE AND METHOD OF PRODUCING

[75] Inventors: Jun-ichi Umeda, Tsukuba; Kazuo Shigematsu, Kitakatsushika, both of Japan

[73] Assignees: Hitachi Maxell, Ltd., Osaka; Hitachi, Ltd., Tokyo, both of Japan

[21] Appl. No.: 291,323

[22] Filed: Dec. 28, 1988

Related U.S. Application Data

[63] Continuation of Ser. No. 866,737, May 27, 1986, abandoned.

[30] Foreign Application Priority Data

May 27, 1985 [JP] Japan .................... 60-112183

[51] Int. Cl.$^5$ ................. G11B 7/24; G11B 7/26
[52] U.S. Cl. ................. 369/275.001; 369/275.003; 369/275.004; 369/284; 346/135.1; 346/76 L
[58] Field of Search ........... 369/275, 284, 286, 288, 369/279, 100, 109, 275.1, 275.4, 275.37; 346/135.1, 76 L; 264/220

[56] References Cited

U.S. PATENT DOCUMENTS

| 4,074,282 | 2/1978 | Balas, Jr. et al. | 269/275 |
| 4,175,145 | 11/1979 | Fechter | 346/135.1 |
| 4,272,574 | 6/1981 | Lippits et al. | 369/275 |
| 4,318,112 | 3/1982 | Kivits et al. | 369/284 |
| 4,389,719 | 6/1983 | Van de Donk et al. | 369/275 |
| 4,423,427 | 12/1983 | Kaiser | 369/286 |
| 4,584,259 | 4/1986 | Mayer et al. | 346/76 L |
| 4,614,705 | 9/1986 | Umehara | 369/284 |
| 4,619,804 | 10/1986 | Leonard et al. | 264/220 |

FOREIGN PATENT DOCUMENTS

| 0108258 | 5/1983 | European Pat. Off. |  |
| 0130698 | 1/1984 | European Pat. Off. |  |
| 60-182531 | 9/1985 | Japan | 369/284 |
| 60-226038 | 11/1985 | Japan | 369/284 |

OTHER PUBLICATIONS

"Glass Handbook" Published in Japan on 9/30/75 and the English translation attached therewith (pp. 1–5).
"Toray Silicone" Silane Coupling Agent, published in Japan on Dec. 21, 1982 and the English translation attached therewith (pp. 1–6).

Primary Examiner—David Trafton
Assistant Examiner—Hoa Nguyen
Attorney, Agent, or Firm—Birch, Stewart, Kolasch & Birch

[57] ABSTRACT

An optical recording disc comprising a resin layer of resin material formed on a relatively rough surface of each transparent disc substrates, the resin material having approximately the same refractive index of light as the refractive index of the transparent disc substrate, and a recording layer formed on each of said resin layers. Accordingly, the optical recording disc enables a decrease in production costs and to write and read an information signal into and from the recording layer at an improved signal to noise ratio as compared to a conventional optical recording disc.

27 Claims, 6 Drawing Sheets

UNIT AND DISC HAVING A RELATIVELY ROUGH SURFACE AND METHOD OF PRODUCING

This application is a continuation, of application Ser. No. 06/866,737 filed on May 27, 1986, now abandoned.

BACKGROUND OF THE INVENTION:

1. Field of the Invention:

The present invention relates to an optical recording disc and a method of the production thereof. The recording disc comprises a transparent disc substrate on one surface of which a resin layer and a recording layer are formed, more particularly, to an optical recording disc and a method of the production thereof having an improved signal to noise ratio.

2. Description of the Prior Art:

There is provided an optical recording disc comprising at least one transparent disc substrate made of glass or plastic material, on one surface of which a resin layer has preformatted pits corresponding to information signal and guiding grooves corresponding to a tracking signal is formed, with a recording layer formed on the surface of the resin layer. In a dual sided optical recording disc, a pair of optical transparent disc substrates are bonded together through spacers so that each of the resin layers and each of the recording layers face each other. On the other hand, in a single sided optical recording disc, one optical transparent disc substrate and a reinforcement plate in a similar shape as the optical transparent disc substrate are bonded together through spacers so that the resin layer and the recording layer face the inside of the optical recording disc.

In this sort of the optical recording disc, when a laser light is radiated onto the top surface of the transparent disc substrate, where the resin layer and to a recording layer through a substrate, information can be written in the disc or read from the disc. Therefore, the transparent disc substrate is required having a high transparency, a smooth surface, a uniformity of thickness and composed of homogeneous material. In particular, the roughness of the surface of the transparent disc substrate 1 onto which the laser light is injected is a significant factor when an information signal is written and read into and from the recording layer of the optical recording disc, and the height h between a peak and a bottom of the rough surface $1b$ is referred to hereinafter as the roughness of the surface of the transparent disc substrate as shown in FIG. 3. A distance $l$ between the peaks of the rough surface $1b$ is also a significant factor as shown in FIG. 3. In an optical recording disc comprising a transparent disc substrate having a relatively rough surface whose roughness h is larger than 0.02 μm, a scattering and a diffraction of the laser light occurs on the rough surface, thereby the signal to noise ratio become smaller than a predetermined signal to noise ratio when an information signal is written and read into and from the recording layer, resulting in that it is difficult for the information signal to be written and read properly. Accordingly, it is necessary for the roughness h to be smaller than 0.02 μm in order to properly write and read an information signal into the recording layer.

On the other hand, the roughness of the surface of the transparent disc substrate where the resin layer is formed is also generally a significant factor, and it is known that relatively small roughness h leads to a larger signal to noise ratio when an information signal is written and read into the recording layer, therefore, it is necessary for the roughness h of the surface where the resin layer is formed to be smaller than 0.02 μm.

In general, the aforementioned transparent disc substrate for an optical recording disc is made by the following methods.

In a first production method of the transparent disc substrate, a mold is formed in a predetermined shape and a predetermined volume of the transparent disc substrate. Melted material made of glass or plastic material is injected into the inside of the mold, then the melting material is solidified, resulting in the transparent disc substrate being formed in the shape of the mold. In the transparent disc substrate made by the aforementioned production method, the surface of the substrate not contacting the surface of the mold during the solidification process, corresponding to the surface solidified by the exposure to the air, becomes relatively smooth surfaced, since the surface is formed independent of the surface of the mold during the above solidification, resulting in a relatively very smooth surface having a roughness h smaller than 0.02 μm ; However, the other surface of the disc substrate contacting the inside surface of the mold during the above solidification becomes a relatively rough surface, since the surface of the mold is transferred to the surface of the disc substrate, resulting in a relatively rough surface having a roughness h larger than 0.02 μm to 0.03 μm and smaller than 0.1 μm, even though the surface of the mold is precisely polished.

In another production method of the transparent disc substrate, the disc substrate is formed by cutting a glass plate being on the market in a predetermined shape. The glass plate is made by the Colburn method or the floating method. In the Colburn method, as shown in FIG. 1, glass material 11 is melted in a furnace 10 and is pulled upward by a pulling roller 12. The pulled glass material 11 is pulled up in the horizontal direction. Then, the pulled semi-melted glass material 11 is pulled out being solidified by the transferring roller 15 arranged in a slow cooling tank 14 following by the furnace 10, resulting in a glass substrate obtained by cutting the solidified glass material in a predetermined length. In the floating method, as shown in FIG. 2, after a thickness of a glass material 11 melted in a furnace 10 is adjusted to a predetermined thickness by a thickness adjustment roller 16, the glass material 11 is slowly flowed onto a top surface of melted tin 18 in a melting metal tank 17. Then, the semi-melting glass plate is pulled out and solidified by a transferring roller 20 arranged in a slow cooling tank 19 following the melted metal tank 17.

In the glass plate made by the aforementioned production methods, the surface of the glass plate, not contacting with the bending roller 13 and the transferring roller 15 in the Colburn method or the melted tin 18 and the transferring roller 20 in the floating method, become relatively smooth having a roughness h smaller than 0.02 μm.

The opposite surface of the solidified glass plate contacting with the bending roller 13 and the transferring roller 15 in the Colburn method or the melted tin 18 and the transferring roller 20 in the floating method becomes relatively rough, since the surface is formed dependent upon the surfaces of the rollers 13, 15 and 20 and the melted tin 18. The relatively rough surface is quickly cooled by contacting with the surfaces of the rollers 13, 15 and 20 and the melted tin 18 with the relatively rough surface having a roughness h in the range of 0.02 μm to 0.03 μm.

Accordingly, as described above, in an optical recording disc comprising the transparent disc substrate having a relatively rough surface whose roughness is larger than 0.02 μm, the scattering and the diffraction of the laser light occurs on the rough surface, thereby a signal to noise ratio becomes smaller and it is difficult for an information signal to be written and read into and from the recording layer. The transparent disc substrate made by the aforementioned method can not be used as a transparent disc substrate for an optical recording disc. Therefore, in general, at least one rougher surface of the transparent disc substrate must be precisely polished, thereby the roughness h of both sides of the transparent substrate is smaller than 0.02 μm.

However, the aforementioned process of polishing precisely has the disadvantages as follows.

(1) The polishing process cost is very expensive, since high skill is necessary.

(2) The production efficiency is very small, since it takes a long time to perform the polishing process.

(3) The polished surface is easily marred during the transferring process to the fabrication process of the optical recording disc after the polishing process, resulting in a decreased percentage of conforming articles. Therefore, the production cost of the conventional optical recording disc comprising the polished transparent disc substrate is very expensive. In case a mold is used during the production of the transparent disc substrate, in addition, it is necessary to form a smooth inside surface of the mold having a roughness h smaller than 0.02 μm and to maintain the smoother surface, resulting in production costs and maintenance costs that are very expensive. Moreover, in case the resin layer onto which the information pattern is transferred is formed onto the precisely polished relatively smooth surface of the transparent disc substrate, there is a problem that the resin layer can be undesirably stripped from the transparent disc substrate, since the transparent disc substrate and the resin layer are not strongly bonded together.

SUMMARY OF THE INVENTION

An essential object of the present invention is to provide an optical recording disc and a method of the production thereof, which can be written and read an information signal at a larger signal to noise ratio than a conventional optical recording disc without scattering and diffraction of laser light, even though the optical recording disc comprises a transparent disc substrate with a relatively rough surface.

Another object of the present invention is to provide an optical recording disc and a method of the production thereof, in which it is unnecessary to polish the relatively rough surfaces of both disc substrates precisely and whose production cost is more inexpensive than a conventional optical recording disc.

A further object of the present invention is to provide an optical recording disc and a method of the production thereof, in which a resin layer can not be easily stripped from a transparent disc substrate.

According to the present invention, there is provide an optical recording disc comprising a pair of transparent disc substrates having a relatively smooth surface and a relatively rough surface, a pair of said transparent disc substrates being bonded together so that the relatively rough surfaces of each of said transparent disc substrates face each other, a resin layer of resin material formed on the relatively rough surface of each of said transparent disc substrates, the resin material having approximately the same refractive index of light as the refractive index of said transparent disc substrate, grooves transferred on each of said resin layers, said grooves including at least one having a signal pattern of preformatted pits corresponding to an information signal and a guiding groove corresponding to a tracking signal, and a recording layer formed on each of said resin layers, each of said recording layers facing each other.

Moreover, there is also provided a method of the production of an optical recording disc comprising steps of forming a pair of transparent disc substrates so as to have a relatively smooth surface and a relatively rough surface, forming a resin layer of resin material on the relatively rough surface of each of said transparent disc substrates, the resin material having approximately the same refractive index of light as the refractive index of said transparent disc substrate, providing grooves on each of said resin layers, said grooves being at least one of a signal pattern of preformatted pits of an information signal and a guiding groove corresponding to a tracking signal, forming a recording layer on the surface of each of said resin layers, and bonding a pair of said transparent disc substrates having said resin layer and said recording layer together so that both of said recording layers face each other.

Accordingly, the optical recording disc according to the present invention enables a decrease in production costs and to make it unnecessary to maintain a smooth surface of the mold, since it is not necessary to polish both of the surfaces of the transparent disc substrate precisely. An information signal can be written and read into and from the recording layer at a larger signal to noise ratio than the conventional optical recording disc without the scattering and the diffraction of laser light, since the resin layer having approximately the same refractive index of light as the refractive index of light of the transparent disc substrate is formed on the relatively rough surface of the transparent disc substrate. Moreover, there can be provided a durable optical recording disc where the transparent disc substrate and the resin layer are strongly bonded together since the resin layer is formed on the relatively rough surface of the transparent disc substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS:

The present invention will become more fully understood from the detailed description given hereinbelow and the accompanying drawings which are given by way of illustration only, and thus are not limitative of the present invention, and wherein.

Figure 1:
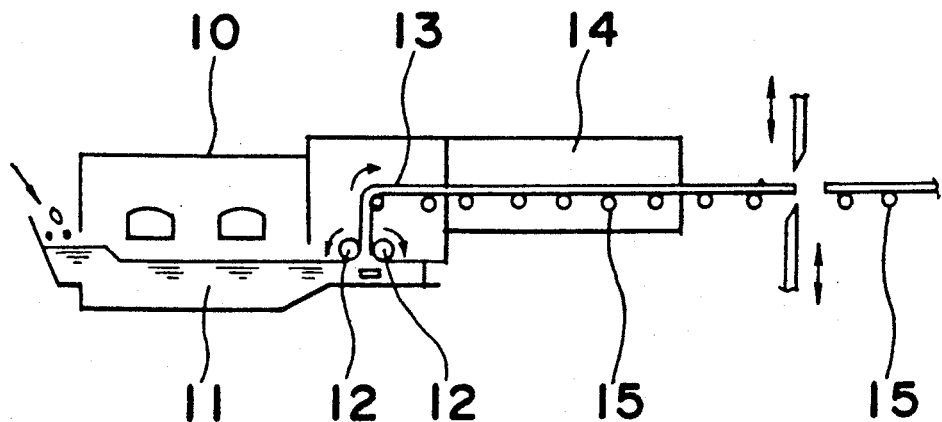
FIG. 1 is a schematic diagram showing a production process of a glass plate by the Colburn method, wherein the glass plate serves as a transparent disc substrate of a conventional optical recording disc.
Figure 2:
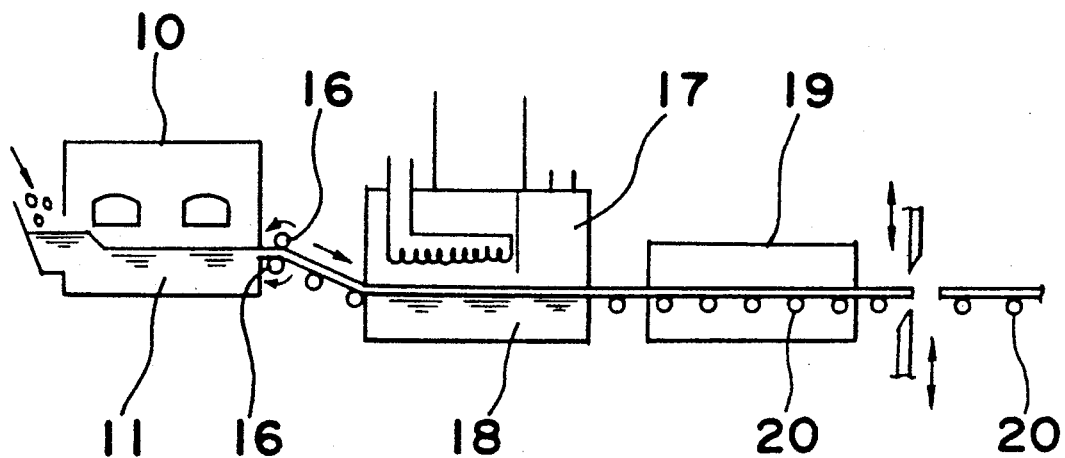
FIG. 2 is a schematic diagram showing a production process of a glass plate by the floating method, wherein the glass plate serves as a transparent disc substrate of a conventional optical recording disc.
Figure 3:
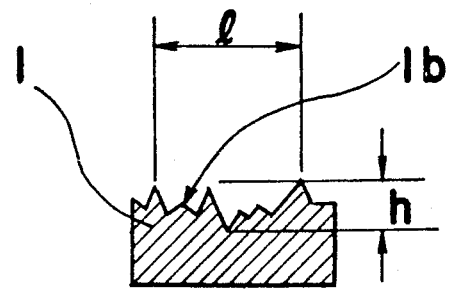
FIG. 3 is a cross sectional view of a rough surface of a transparent disc substrate showing a roughness corresponding to a height h between the peak and the bottom of the rough surface and a distance l between the peaks of the rough surface.
Figure 4A:
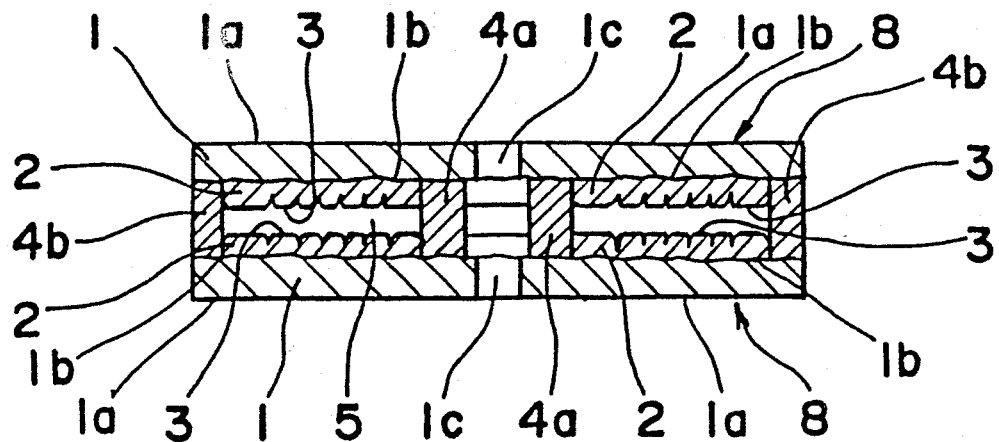
FIG. 4(a) is a cross sectional view of an optical recording disc according to the present invention.

DESCRIPTION OF THE PREFERRED EMBODIMENTS:

Referring to FIG. 4(a), a first preferred embodiment of an optical recording disc according to the present invention will be described below in detail. FIG. 4(a) is a cross sectional view of the first preferred embodiment of the optical recording disc. In FIG. 4(a), there is provided a pair of disc substrates 1 made of transparent glass comprising a relatively smooth surface 1a and a relatively rough surface 1b, wherein a spindle insertion hole 1c is formed at the center of each of the disc substrates 1. A pair of disc substrates 1 are bonded together through a cylindrical inner spacer 4a and a cylindrical outer spacer 4b described below in detail so that the relatively rough layer surfaces 1b of each of the disc substrates 1 face each other. Resin layers 2 made of synthetic resin material are respectively formed on the relatively rough surfaces 1b of both of the disc substrates 1, and the recording layers 3 are respectively formed on the surfaces of both of the resin layers 2. After the cylindrical inner spacer 4a is mounted on the inner rim portion of each of the disc substrate 1 and the cylindrical outer spacer 4b is mounted on the outer rim portion of each of the disc substrate 1, a pair of the disc substrates 1 (referred to as the optical disc unit 8) comprising the resin layer 2 and recording layer 3 are bonded together through the cylindrical inner spacer 4a and the cylindrical outer spacer 4b so that both of the recording layers 3 face each other and an air space is formed between both of the recording layers 3 formed on the surfaces of each of the disc substrates 1.

The disc substrate 1 is made as follows. That is, first of all, a glass plate is made by the aforementioned Colburn method, and the glass plate is cut in a predetermined disc shape. It is noted that the Colburn method is described in the "Glass Handbook" published in Japan on Sept. 30, 1975, for example. Then, the kalium replace process is performed on the glass plate so as to improve the optical performance of the glass plate and the silane process is performed on the relatively rough surface 1b of the glass plate so as to strengthen the bonding between the disc substrate 1 and the resin layer 2, resulting in that the optical disc unit 8 is obtained.

Reference is made to "Toray Silicone" published in Japan on Dec. 21, 1982 for information relative to the silane process.

Figure 4B:
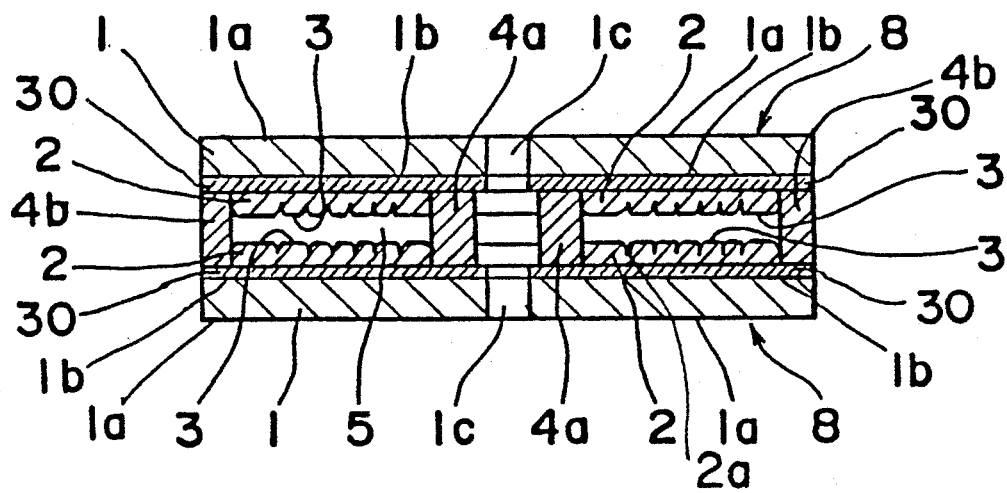
FIG. 4(b) is a cross sectional view of an optical recording disc comprising a further resin layer according to the present invention.
Figure 4C:
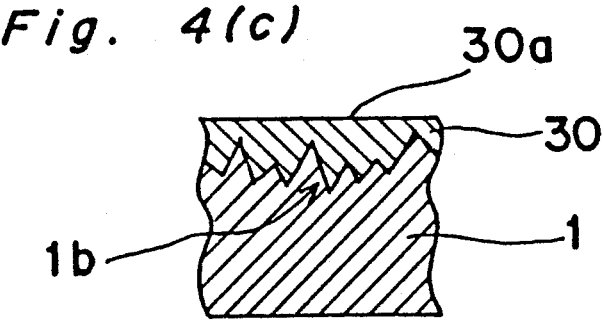
FIG. 4(c) is an enlarged cross sectional view of a transparent disc substrate and the further resin layer shown in FIG. 4(b)

Instead of the aforementioned silane process, as shown in FIGS. 4(b) and 4(c), a further resin layer 30 having a predetermined thickness may be formed on the relatively rough surface 1b of the disc substrate 1 so that a relatively smooth surface 30a of the further resin layer 30 is formed on the relatively rough surface 1b of the disc substrate 1. The further resin layer 30 is made of plastic resin material having approximately the same refractive index of light as the refractive index of light of the glass material of the disc substrate 1. The resin layer 2 and the recording layer 3 are formed on the further resin layer 30 in a similar manner shown in FIG. 4(b). In the fabricated optical recording disc, the further resin layer 30 may be formed between the disc substrate 1 and the resin layer 2, and on the relatively smooth surface 30a of the further resin layer 30, as shown in FIG. 4(b). The further resin layer 30 formed on the disc substrate 1 mentioned above shows an advantage in that the disc substrate 1 and the resin layer 2 are strongly bonded together through the further resin layer 30 since the resin layer 2 is formed on the relatively smooth surface 30a of the further resin layer 30. Another advantage is that it is unnecessary to select which surface is the relatively smooth surface of the disc substrate 1 in the fabrication process, since the relatively smooth surface 30a of the further resin layer 30 is formed on the relatively rough surface 1b of the disc substrate 1.

The resin layer 2 is made of resin material, and the resin material has approximately the same refractive index of light as the refractive index of light of the glass material of which the disc substrate 1 is made, wherein the refractive index of light of the glass material is approximately 1.5. The resin layer 2 is formed on the relatively rough surface 1b of the disc substrate 1.

The recording layer 3 is made of Pb - Se - Te, and the recording layer 3 is deposited on the surface of the resin layer 2 by the vacuum vapor deposition method so as to deposit a resin layer 2 having a thickness of approximately 27 nm.

The cylindrical inner spacer 4a is made of Fe - Cr alloy and has a thickness of 0.6 mm, and the cylindrical outer spacer 4b is made of aluminium and has a thickness of 0.6 mm. The cylindrical inner spacer 4a and the cylindrical outer spacer 4b are respectively mounted on the inner and the outer rim portions of each of the optical disc unit 8, and a pair of the optical disc units 8 are bonded together through the inner and the outer spacers 4a and 4b so that an air spacing of 0.46 mm is formed between both of the recording layers 3.

Figure 5A:
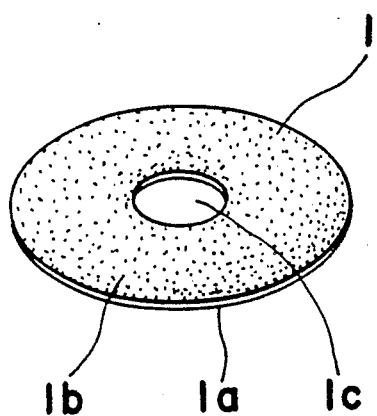
FIG. 5(a) is a perspective view of the transparent disc substrate of the optical recording disc shown in FIG. 4(a), FIGS. 5(b) to 5(f) are cross sectional views of the transparent disc substrate of the optical recording disc shown in FIG. 4(a) showing a production process thereof.

Next, referring to FIGS. 5(a) to 5(f), the production method for forming the optical disc unit 8 will be described below in detail. First of all, as shown in FIG. 5(a), a glass plate having a thickness of 1.17 mm is made by the aforementioned Colburn method, and the glass plate is cut in a predetermined disc shape having a diameter of 30 cm and a center hole corresponding to the spindle insertion hole 1c. Then, after the glass plate is washed properly, the kalium replace process is performed to the glass plate so as to improve the optical performance of the glass plate and the silane process is performed to the relatively rough surface 1b of the glass plate so as to strengthen the bonding between the disc substrate 1 and the resin layer 2, resulting in that the disc substrate 1 is obtained. As described above, instead of the silane process, the further resin layer 30 having the relatively smooth surface 30a may be formed on the relatively rough surface 1b of the disc substrate 1 as shown in FIGS. 4(b) and 4(c).

Figure 5D:
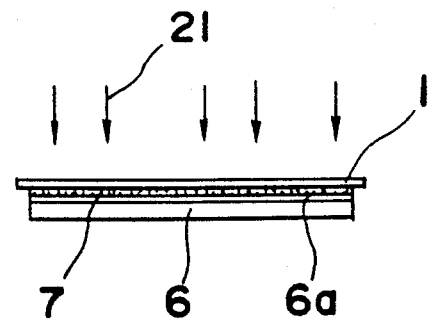
Figure 5C:
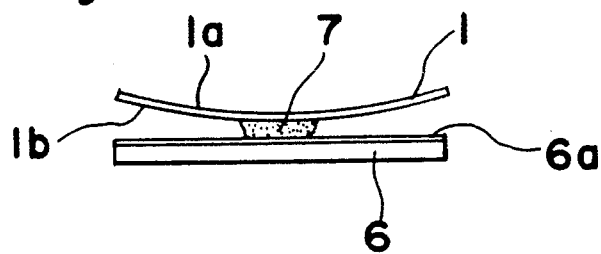
Figure 5E:
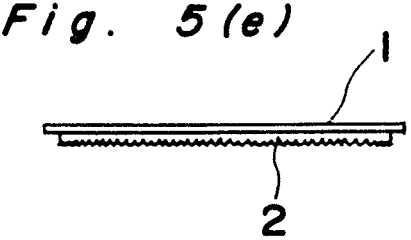
Figure 5B:
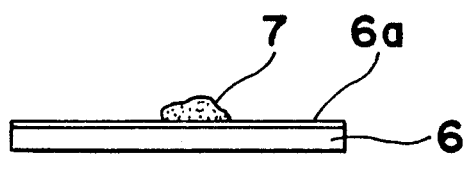

Then, as shown in FIG. 5(b), an optical hardening resin material 7 having approximately the same refractive index of light as the refractive index of light of the disc substrate 1 is put around the center portion of a pattern forming surface 6a of a stamper 6 on which an inverted pattern is formed, wherein the inverted pattern is inverted to a signal pattern to be stamped onto the resin layer 2 of the optical recording disc. Thus, as in any stamping operation, the stamper surface 6a is the reverse image of the surface image desired on the material being stamped.

As shown in FIG. 5(c), after the disc substrate 1 is put on the optical hardening resin material 7 so that the center portion of the rough surface 1b of the disc substrate 1 contacts with the resin material 7, the center portion of the disc substrate 1 is pushed down so that the resin material 7 projects to the outer rim portion of the surface 6a of the stamper 6, then the resin material 7 is radially and uniformly extended by pushing down the disc substrate 1 from the center portion to the outer rim portion thereof. After the extending process of the resin material 7 is completed as shown in FIG. 5(d), a light 21 for hardening the resin material 7 is radiated onto the disc substrate 1 and the resin material 7 while the resin material 7 is uniformly pressurized, as shown in FIG. 5(d).

As shown in FIG. 5(e), after hardening the resin material 7, and the resin layer 2 is bonded as one body with the disc substrate 1, the disc is stripped from the stamper 6.

Figure 5F:
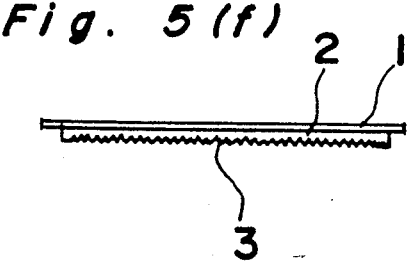

Then, as shown in FIG. 5(f), the recording layer 3 made of Pb - Se - Te having a thickness of 27 nm is deposited on the surface of the resin layer 2 having an information pattern or grooves 2a by the vacuum vapor deposition method, resulting in the optical disc unit 8. Then, another optical disc unit 8 is made by the above process.

Finally, a pair of the optical disc units 8 formed as described above are bonded together through the inner and the outer spacers 4a and 4b having a thickness of 0.6 mm, resulting in an air sandwich type optical recording disc. The resulting recording disc has an air spacing of 0.46 mm formed between the recording layers 3, as shown in FIG. 4(a).

In the fabricated optical recording disc, the scattering and the diffraction of the laser light do not occur on the outside surface of the disc substrate 1 corresponding the surface at the incident side of the laser light since the outside surface of the disc substrate 1 is relatively smooth, and the scattering and the diffraction of the laser light does not occur on the boundary surface between the relatively rough surface 1b of the disc substrate 1 and the surface of resin layer 2 since the resin layer 2 has approximately the same refractive index of light as the refractive index of the glass material of the disc substrate formed on the surface of the relatively rough surface 1b of the disc substrate 1. Therefore, a larger signal to noise ratio can be obtained than the conventional optical recording disc, when an information signal is written and read into and from the recording layer 3, even though the disc substrate 1 comprises the relatively rough surface 1b.

The recording and playing back characteristics of the aforementioned preferred embodiment of the optical recording disc according to the present invention will be described below, as compared with an optical recording disc comprising a disc substrate 1 made by the Colburn method, a resin layer 2 being formed on a relatively smooth surface 1a of the disc substrate 1. The comparative optical recording disc is referred to as "the comparative example" of the optical recording disc.

Figure 6:
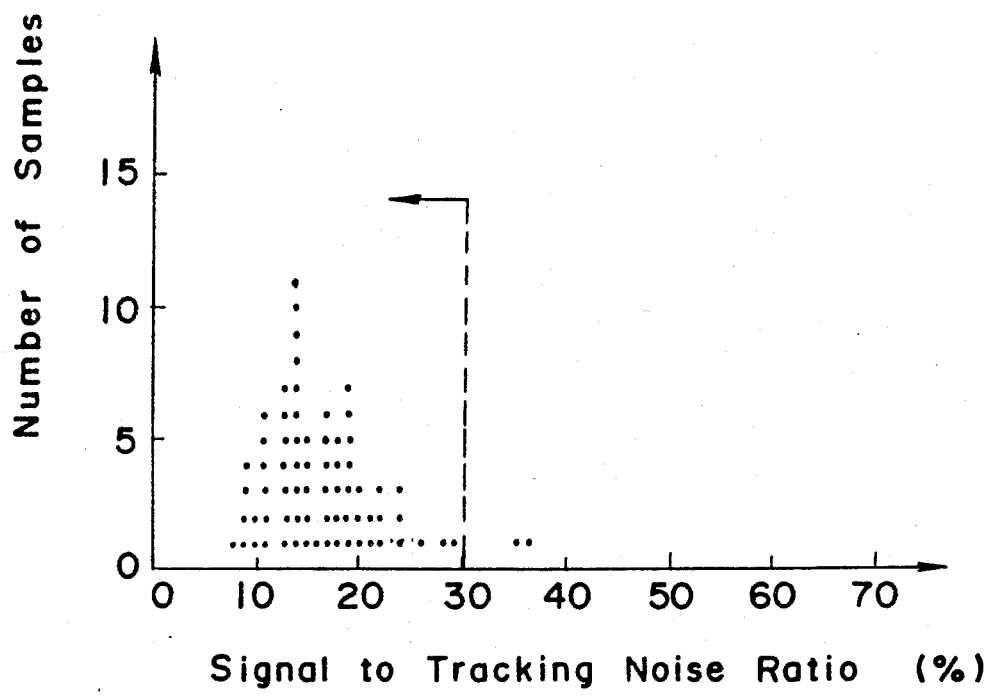
FIG. 6 is a graph showing a distribution characteristic of signal to tracking noise ratios of the optical recording discs shown in FIG. 4(a)
Figure 7:
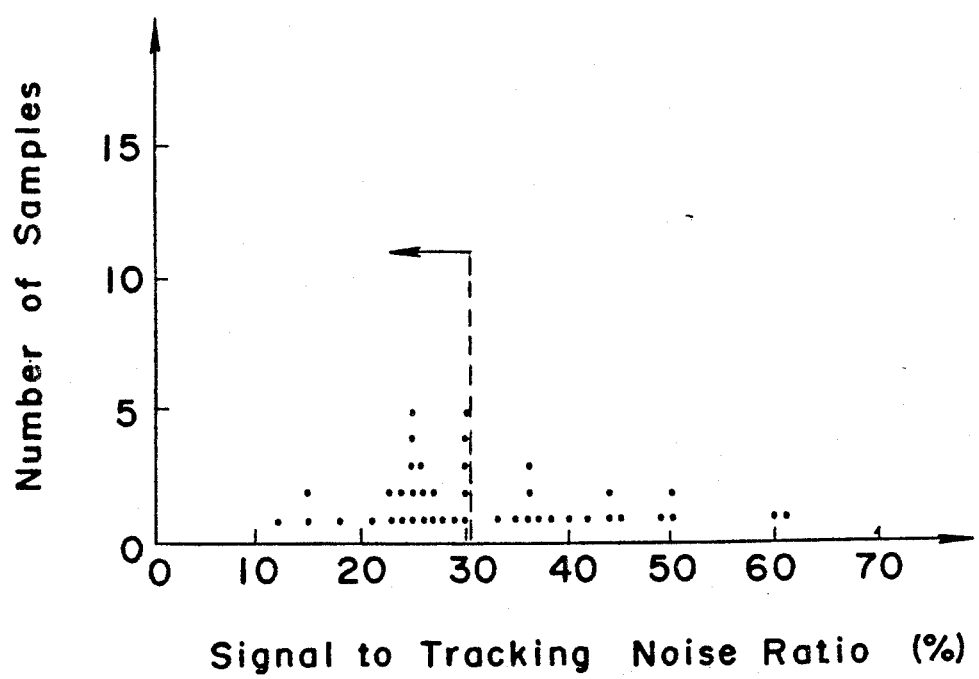
FIG. 7 is a graph showing a distribution characteristic of signal to tracking noise ratios of a comparative examples of the optical recording disc.

FIG. 6 is a graph showing a distribution characteristic of signal to tracking noise ratios (percentages) measured in the aforementioned preferred embodiments of the optical recording disc, and FIG. 6 is a graph showing a distribution characteristic of signal to tracking noise ratios (percentages) measured in the comparative examples of the optical recording disc. In FIGS. 6 and 7, the horizontal axis of the graph is a predetermined signal voltage (Volts) to the measured tracking noise voltage (Volts) ratio (percentages), and the longitudinal axis of the graph is the number of the measured samples.

After the 37 samples of aforementioned preferred embodiments of the optical recording disc are made, the tracking noise of the 74 surfaces of the optical recording discs were measured by the heterodyne method, resulting in that the distribution characteristic shown in FIG. 6. On the other hand, after 24 samples of the comparative examples of the optical recording disc are made, the tracking noise of the 48 surfaces of the comparative examples of the optical recording disc were measured by the heterodyne method, resulting in the distribution characteristic shown in FIG. 7.

In the heterodyne method, when a light beam radiated from an optical head tracks a groove formed on the optical recording disc, the tracking noise corresponding to the tracking error is detected independent of the intensity of the light beam by measuring the difference between the intensity of the diffraction light reflected to the left side of the groove and the intensity of the diffraction light reflected to the right side of the groove.

According to our experiment, a proper tracking of the laser head could not be obtained on the condition that the signal voltage to tracking noise voltage ratio exceeded a signal to noise ratio of 30 percent. From that view point, the evaluation of both of the optical recording discs will be described below. As shown in FIG. 7, in the measured result of the 43 examples of the comparative example of the optical recording disc comprising the disc substrate 1 having the relatively smooth surface 1a where the resin layer 2 and the recording layer 3 are formed, the signal to tracking noise ratios of 26 samples of the comparative examples of the optical recording disc were within the permissible range of the signal to tracking noise ratio, resulting in the rate of conforming article of only 60 percent. On the other hand, as shown in FIG. 6, in the measured result of the 74 examples of the preferred embodiments of the optical recording disc, the signal to tracking noise ratio of 72 samples of the preferred embodiments of the optical recording disc were within the permissible range of the signal to tracking noise ratio, resulting in the rate of conforming article being 97 percent.

Figure 8:
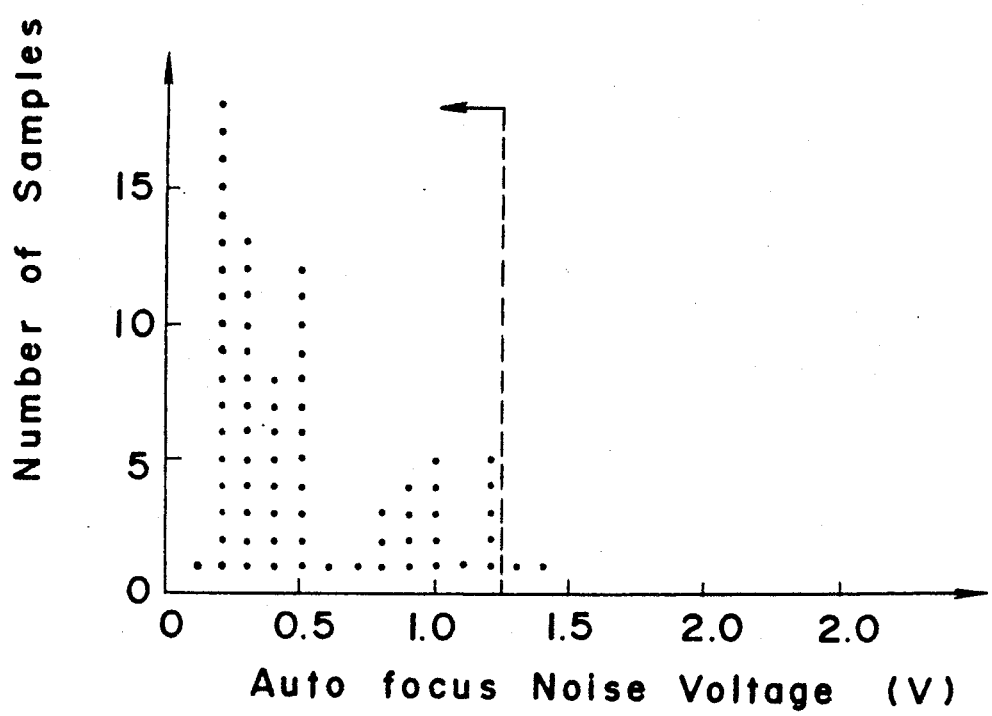
FIG. 8 is a graph showing a distribution characteristic of auto focus noise voltages of the optical recording disc shown in FIG. 4(a)
Figure 9:
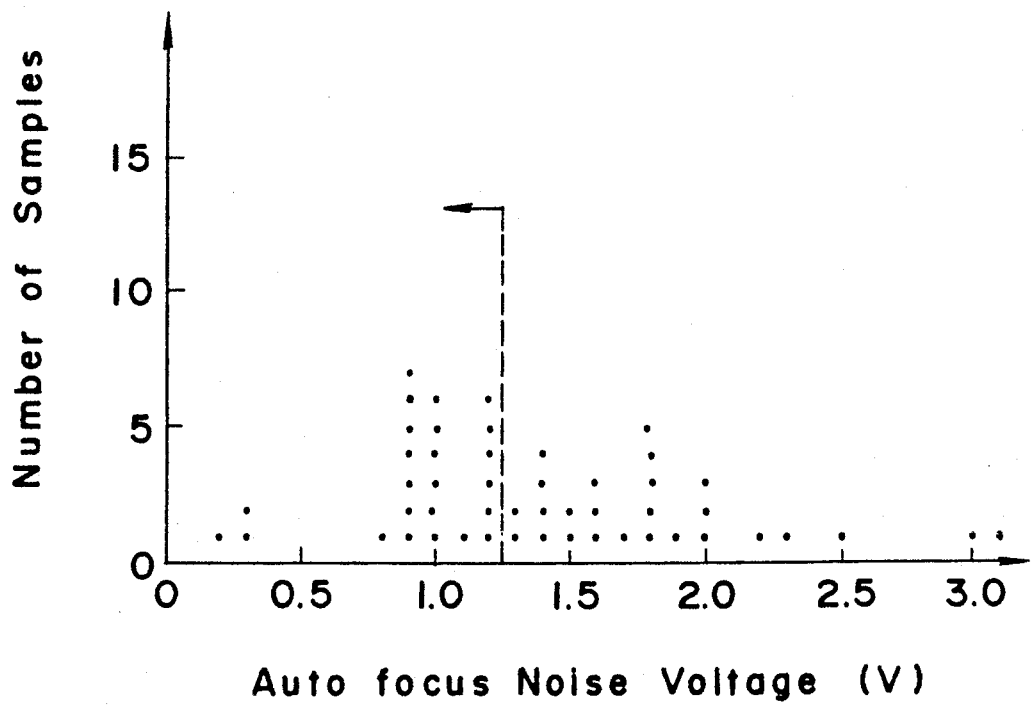
FIG. 9 is a graph showing a distribution characteristic of auto focus noise voltages of comparative examples of the optical recording disc.

FIG. 8 is a graph showing a distribution characteristic of auto focus noise voltages measured in the aforementioned preferred embodiments of the optical recording disc, and FIG. 9 is a graph showing a distribution characteristic of auto focus noise voltages measured in the comparative examples of the optical recording disc. In FIGS. 8 and 9, the horizontal axis of the graph is the measured auto focus noise voltage (Volts), and the vertical axis of the graph is the number of measured samples.

The auto focus noise voltages of the 74 surfaces of the preferred embodiment of the optical recording disc was measured by the beam deflection method, resulting in that the distribution characteristic of the auto focus noise voltages shown in FIG. 8. On the other hand, the auto focus noise voltage of the 48 surfaces of the comparative example of the optical recording disc were measured by the beam deflection method, resulting in the distribution characteristic of the auto focus noise voltages shown in FIG. 9.

In the beam defection method, an optical system is arranged in an optical head so that a reflected light on the optical recording disc has as astigmatism, the image of the reflected beam is distorted on an optical detector arranged in the optical head when the light radiated from the optical head is out of focus on the reflection surface of the optical recording disc, then the auto focus noise voltage is measured by detecting the distortion of the image of the reflected beam.

According to our experiment, a laser light could not be on focus on the boundary surface between the resin layer 2 and the recording layer 3 on the condition that the auto focus noise voltage exceeded 1.2 volts. From that view point, the evaluation of both of the optical recording discs will be described below.

As shown in FIG. 9, in the measured result of the 48 examples of the comparative example of optical recording disc comprising the disc substrate 1 having the relatively smooth surface 1a where the resin layer 2 and the recording layer 3 were formed, the auto focus noise voltages of the 24 samples of the comparative example of the optical recording disc were within permissible range, resulting in the rate of conforming article of only 50 percent. On the other hand, as shown in FIG. 8, in the measured result of the 74 examples of the preferred embodiments of optical recording disc, the auto focus noise voltages of 72 samples of the preferred embodiments of the optical recording disc were within the permissible range, resulting in the rate of conforming article of 97 percent.

Accordingly, in the preferred embodiment of the optical recording disc according to the present invention, around the same rate of conforming article could be obtained as the rate of conforming article of the aforementioned conventional optical recording disc comprising the disc substrates 1 whose surfaces are precisely polished.

A second preferred embodiment of the optical recording disc according to the present invention will be described below. In the second preferred embodiment of the optical recording disc, a relatively rough surface 1b having a predetermined roughness is intentionally formed on one surface of the disc substrate 1 and a resin layer 2 where an information pattern is formed on the relatively rough surface 1b.

Figure 10:
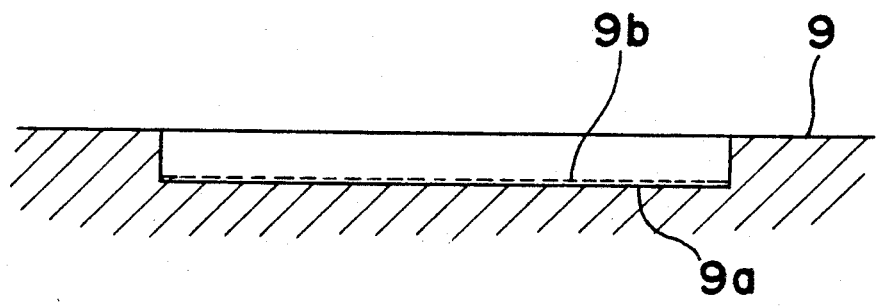
FIGS. 10(a) and 10(c) are cross sectional views showing a production process of a second embodiment of a transparent disc substrate of an optical recording disc according to the present invention.
FIGS. 10(b) and 10(d) are plane views of a rough surface of a transparent disc substrate made by the processes shown in FIGS. 10(a) and 10(c), respectively.
Figure 10:
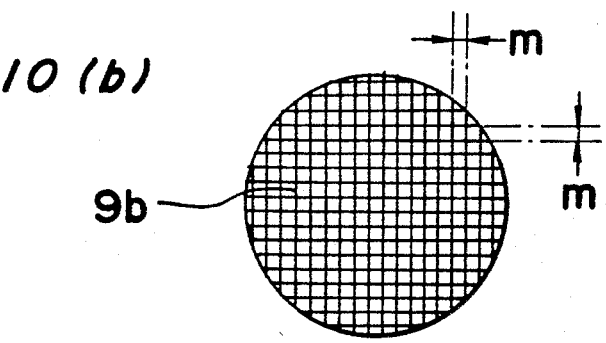
Figure 10:
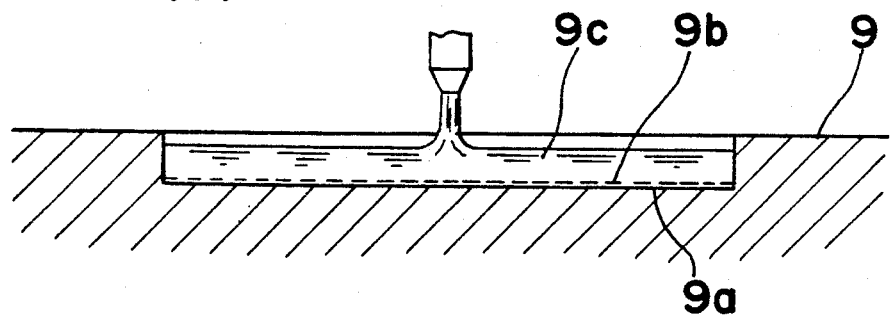
Figure 10:
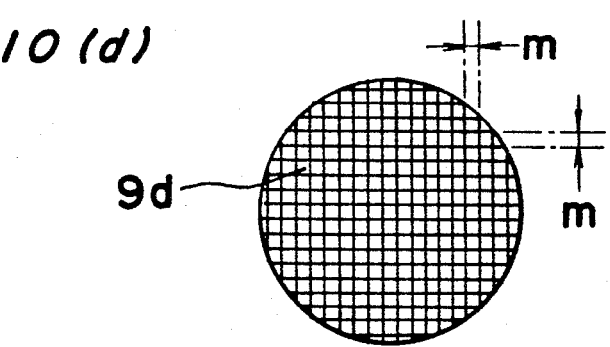

A production method of the second preferred embodiment of the optical recording disc will be described below. First of all, as shown in FIG. 10(a), a net 9b shown in FIG. 10(b), made of a stainless steal wire material at an interval m between the meshes of approximately 60 μm, is put on the whole bottom surface 9a of the mold 9 made of stainless steal. Then, as shown in FIG. 10(c), a predetermined material 9c of the disc substrate 1 such as melted glass or melted plastic material is injected into the mold 9. After injecting the material 9c and the free top surface of the material 9c is relatively smooth, the mold is cooled so as to solidify the material 9c. Then, the disc 9d corresponding to the solidified material 9c is taken out of the mold 9, with the meshes m of the net 9b being transferred to one surface of the disc 9d. After the disc 9d is cut in a predetermined shape so as to have a center hole 1c, the disc substrate 1 having a thickness of 1.2 mm and an outer diameter 30 cm is obtained.

Then, the aforementioned second preferred embodiment of the optical recording disc can be obtained by the similar production method to the production method shown in FIGS. 5(a) to 5(f). That is, after the resin layer 2 is deposited on the rough surface of the disc substrate 1 where the meshes m are formed, the recording layer 3 is formed on the surface of the resin layer 2 where an information pattern is formed, resulting in that the optical disc unit 8. Then, a pair of the optical disc units 8 are bonded together through the inner and the outer spacers 4a and 4b forming the optical recording disc.

After 37 optical recording discs comprising the optical disc unit 8 having the disc substrate 1 were made, the signal to the tracking noise ratios of the optical recording disc were measured by the heterodyne method. In the measured result, a distribution characteristic was obtained similar to the distribution characteristic shown in FIG. 6.

In a second preferred embodiment of the optical recording disc, the predetermined rough surface is formed on one surface of the disc substrate 1 by putting the net 9b on the whole bottom surface 9a of the mold 9, however, the broad subject matter of the present invention is that a rough surface having a predetermined roughness is intentionally formed on one surface of the disc surface and a resin layer having an information pattern is formed on the rough surface of the disc substrate. The method for forming the rough surface on the disc substrate need not be limited to the aforementioned method. For example, the bottom surface 9a may be formed so as to have a predetermined roughness.

In the first and second preferred embodiments of the optical recording disc according to the present invention, the resin material of the resin layer 2 having approximately the same refractive index n1 of light is used as the refractive index n2 of light of the glass material of the disc substrate 1, however, both of the refractive indexes n1 and n2 need not be strictly the same. The relation between both of the refractive indexes may be $n1/n2 \leqq 0.9$.

The subject matter of the present invention includes one surface of the disc substrate being made relatively smooth, while another surface of the disc substrate is made relatively rough on which a resin layer having an information pattern is formed. The resin layer 2 has approximately the same refractive index of light as the refractive index of light of the material of the disc substrate, however, the shape and volume of the disc substrate 1, the resin layer 2 and recording layer 3, the material and thickness of the recording layer 3, and the production method of the optical disc unit 8 need not be limited to the aforementioned preferred embodiments of the optical recording disc.

In the first preferred embodiment of the optical recording disc, the transparent disc substrate 1 of a glass material is made by the Colburn method, however, the transparent disc 1 may be made by the aforementioned floating method. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording disc unit comprising:
   a transparent disc substrate made of a not polished glass plate having a first side and a second side, said first side having a relatively smooth surface with a maximum peak height of roughness of less than 0.02 microns, said second side having a relatively rough surface with projections in the range of height of greater than 0.02 micron and less than 0.1 microns;
   said second side being provided with a resin layer having an information signal pattern and a tracking signal pattern, and a recording layer being formed on said resin layer, the surface of said second side being formed of a silane processed layer of silane processing, said silane processed layer being covered with said resin layer; and
   said resin layer having approximately the same refractive index of light as the refractive index of said transparent disc substrate.

2. The disc unit according to claim 1, wherein said information signal pattern is produced by preformatted pits and the tracking signal pattern is provided by a guiding groove.

3. An optical recording disc, said disc comprising;
   a first optical recording disc unit;
   a second optical recording disc unit;
   a cylindrical inner spacer; and
   a cylindrical outer spacer, each recording disc unit comprising:
   a transparent disc substrate made of a not polished glass plate having a first side and a second side, said first side having a relatively smooth surface with a maximum peak height of roughness of less than 0.02 microns, said second side having a relatively rough surface with projections in the range of height of greater than 0.02 microns and less than 0.1 microns;
   said second side being provided with a resin layer having an information signal pattern and a tracking signal pattern, and a recording layer being formed on said resin layer, the surface of said second side being formed of a silane processed layer by silane processing, said silane processed layer being covered with said resin layer;
   said resin layer having approximately the same refractive index of light as the refractive index of said transparent disc substrate.

4. The disc according to claim 3, wherein said information signal pattern is produced by preformatted pits and the tracking signal pattern is provided by a guiding groove.

5. An optical recording disc comprising:
   at least one transparent disc substrate having its one surface made relatively smooth surface and at least a part of its opposite surface made a relatively rough surface;
   a resin layer of resin material formed on the relatively rough surface of said transparent disc substrate, the resin material having approximately the same refractive index of light as the refractive index of said transparent disc substrate, said resin layer having an information signal pattern and a tracking signal pattern and
   a recording layer formed on said resin layer,
   characterized in that said relatively smooth surface of said disc substrate having a maximum peak height of roughness less than 0.02 microns and directed to a side to which recording and reproducing light is radiated and said relatively rough surface having projections of the height of which is in the range of greater than 0.022 microns and less than 0.1 microns, said relatively rough surface being directed to said resin layer.

6. The optical disc as defined in claim 5, wherein said resin layer is light hardening resin.

7. An optical recording disc comprising:
   a pair of transparent disc substrates each having a relatively smooth surface and a relatively rough surface, said pair of transparent disc substrates being bonded together so that the relatively rough surface of each of said transparent disc substrates face each other;
   a resin layer of resin material formed on the relatively rough surface of each of said transparent disc substrates, the resin material having approximately the same refractive index of light as the refractive index of said transparent disc substrate;
   each said resin layer having an information signal pattern and a tracking signal pattern and
   a recording layer formed on each of said resin layer; each of said recording layers facing each other,
   characterized in that said relatively smooth surface of said disc substrate having a maximum peak height of roughness less than 0.02 microns and directed to a side to which recording and reproducing light is radiated and said relatively rough surface having projections, the height of which is in the range of greater than 0.02 microns and less than 0.1 microns, and relatively rough surface being directed to said resin layer.

8. An optical recording disc unit comprising:
   a transparent disc substrate made of a plastic resin having a first side and a second side, said first side having a relatively smooth surface with a maximum peak height of roughness of less than 0.02 microns, said second side having a relatively rough surface with projections in the range of height greater than 0.02 micron and less than 0.1 microns;
   said second side of the disc substrate being provided with a layer formed of a resin layer, having an information signal pattern and a tracking signal pattern, and a recording layer being formed on said resin layer, said resin layer made of resin from the same resin as said disc substrate;

said resin layer having approximately the same refractive index of light as the refractive index of said transparent disc substrate.

9. The disc unit according to claim 8, wherein said information signal pattern is produced by preformatted pits and the tracking signal pattern is provided by a guiding groove.

10. An optical recording disc, said disc comprising:
first optical recording disc unit;
a second optical recording disc unit;
a cylindrical inner spacer; and
a cylindrical outer spacer, each recording disc unit comprising:
a transparent disc substrate made of a plastic resin having a first side and a second side, said first side having a relatively smooth surface with a maximum peak height of roughness of less than 0.02 microns, said second side having a relatively rough surface with projections in the range of height of greater than 0.02 micron and less than 0.1 microns;
said second side of the disc substrate being provided with a layer formed of a resin layer having an information signal pattern and a tracking signal pattern, and a recording layer being formed on said resin layer, said resin layer made of resin from the same resin as said disc substrate;
said resin layer having approximately the same refractive index of light as the refractive index of said transparent disc substrate.

11. The disc according to claim 10, wherein said information signal pattern is produced by preformatted pits and the tracking signal pattern is provided by a guiding groove.

12. A method of producing an optical recording disc comprising the steps of:
forming a not polished glass plate into a transparent disc substrate, distinguishing a first side of the disc substrate having a relatively smooth surface with a maximum peak height of roughness of less than 0.02 microns, said second side having a relatively rough surface with projections in the range of height of greater than 0.02 microns and less than 0.1 microns;
performing a silane process on the second side to form a silane processed film,
forming a resin layer having an information signal pattern and a tracking signal pattern on said second side of the disc substrate on which the silane processed film is already formed for holding preformatted pits producing the information signal pattern,
forming a recording layer on said information signal pattern and tracking signal pattern of the resin layer.

13. The method according to claim 12, wherein said optical disc substrate is made by the Colburn method.

14. The method according to claim 12, wherein said optical disc substrate is made by a floating method.

15. The method according to claim 12, wherein said information signal pattern is provided by preformatted pits and the tracking signal pattern is provided by a guiding groove.

16. The method according to claim 12, wherein said first resin layer is light hardening resin.

17. A method of producing an optical disc comprising steps of:
preparing a pair of the optical discs of claim 12,
opposing the respective recording layers, bonding an outer spacer and an inner spacer on the rough sides of the recording sides of the optical disc substrates.

18. The method according to claim 17 wherein said first optical disc substrate is formed by the Colburn method.

19. The method according to claim 17, wherein said first optical disc substrate is formed by the floating method.

20. The method according to claim 17, wherein said information signal pattern is produced by preformatted pits and the tracking signal pattern is provided by a guiding groove.

21. A method of producing an optical recording disc comprising the steps of:
forming a resin plate into a transparent disc substrate, distinguishing a first side of the disc substrate having a relatively smooth surface with a maximum peak height of roughness of less and 0.2 microns, said second side having a relatively rough surface with projections in the range of height of greater than 0.02 microns and less than 0.1 microns;
forming a resin layer having an information signal pattern and a tracking signal pattern on said second side of the disc substrate for holding preformatted pits producing the information signal pattern,
forming a recording layer on the information signal and tracking signal patterns of the resin layer.

22. A method of producing an optical disc comprising steps of:
preparing a pair of the optical discs of claim 21,
opposing the respective recording layers, bonding an outer spacer and an inner spacer on the rough sides of the recording sides of the optical disc substrates.

23. The method according to claim 22, wherein said first optical disc substrate is formed by the Colburn method.

24. The method according to claim 22, wherein said first optical disc substrate is formed by the floating method.

25. The method according to claim 22, wherein said information signal pattern is produced by preformatted pits and the tracking signal pattern is provided by a guiding groove.

26. The method according to claim 21, wherein said information signal pattern is produced by preformatted pits and the tracking signal pattern is provided by a guiding groove.

27. The method according to claim 21, wherein said resin layer is light hardening resin.

* * * * *